United States Patent [19]
Nishiguchi et al.

[11] Patent Number: 5,940,156
[45] Date of Patent: Aug. 17, 1999

[54] LCD AND METHOD FOR PRODUCING WITH A LARGER POLYMERIZATION RATE IN NON-PIXEL REGIONS THAN THAT IN PIXEL REGIONS

[75] Inventors: Kenji Nishiguchi, Osaka; Kohichi Fujimori, Nabari, both of Japan

[73] Assignee: Sharp Kabushiki Kaisha, Osaka, Japan

[21] Appl. No.: 08/823,866

[22] Filed: Mar. 25, 1997

[30] Foreign Application Priority Data

Mar. 26, 1996 [JP] Japan ..................................... 8-070786
Aug. 30, 1996 [JP] Japan ..................................... 8-231088

[51] Int. Cl.$^6$ ....................... G02F 1/1333; G02F 1/1339; G02F 1/13
[52] U.S. Cl. ............................. 349/156; 349/86; 349/155; 349/187
[58] Field of Search .................................. 349/155, 156, 349/86, 187

[56] References Cited

U.S. PATENT DOCUMENTS

| | | | |
|---|---|---|---|
| 5,333,074 | 7/1994 | Hikmet | 359/51 |
| 5,473,450 | 12/1995 | Yamada et al. | 359/51 |
| 5,608,555 | 3/1997 | Onishi et al. | 349/156 |
| 5,621,553 | 4/1997 | Nishiguchi et al. | 349/156 |
| 5,625,473 | 4/1997 | Kondo et al. | 349/86 |
| 5,668,651 | 9/1997 | Yamada et al. | 349/156 |
| 5,726,728 | 3/1998 | Kondo et al. | 349/156 |
| 5,729,312 | 3/1998 | Yamagishi et al. | 349/155 |

FOREIGN PATENT DOCUMENTS

| | | |
|---|---|---|
| 5-257135 | 10/1993 | Japan . |
| 6-301015 | 10/1994 | Japan . |
| 7-287241 | 10/1995 | Japan . |

*Primary Examiner*—William L. Sikes
*Assistant Examiner*—Toan Ton
*Attorney, Agent, or Firm*—Dike, Bronstein, Roberts & Cushman, LLP; David G. Conlin

[57] ABSTRACT

A liquid crystal display device of the present invention includes: a liquid crystal region made of a liquid crystal as a display medium; and a polymer wall surrounding the liquid crystal region between a pair of substrates, wherein the polymer wall is formed by selectively radiating light having different irradiation intensities to an irradiation intensity-dependent mixture containing a photopolymerizable monomer.

6 Claims, 5 Drawing Sheets

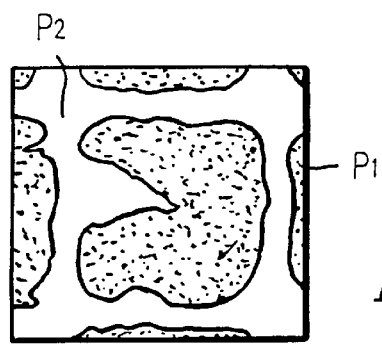
*FIG.5*
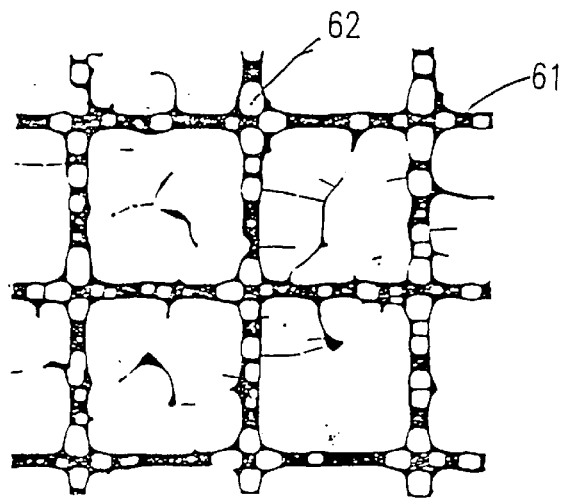
*FIG.6*
*FIG.7*
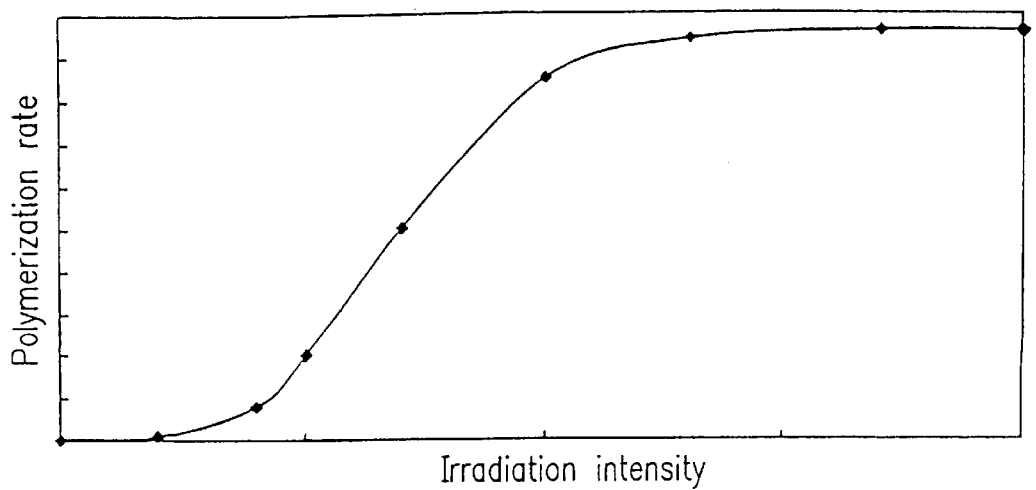

LCD AND METHOD FOR PRODUCING WITH A LARGER POLYMERIZATION RATE IN NON-PIXEL REGIONS THAN THAT IN PIXEL REGIONS

BACKGROUND OF THE INVENTION

1. Field of the Invention

The present invention relates to a liquid crystal display device and a method for producing the same. In particular, the present invention relates to a liquid crystal display device using a liquid crystal partitioned by polymer walls as a display medium and a method for producing the same.

2. Description of the Related Art

Conventionally, various display media have been used for liquid crystal display devices. Examples of a display mode used for the display media include a twisted nematic (TN) mode, a super twisted nematic (STN) mode, an electrically controlled birefringence (ECB) mode, a ferroelectric liquid crystal (FLC) mode, and a scattering mode such as a polymer dispersed type liquid crystal (PDLC) mode.

In recent years, in order to enhance the light utilization efficiency of devices, the PDLC mode has been receiving particularly attention among the above-mentioned display modes. As the PDLC mode, a system which electrically controls a transparent state and an opaque state, using the birefringence of a liquid crystal, is known. According to this system, basically, the ordinary refractive index of liquid crystal molecules in a display medium is made identical with the refractive index of a polymer which is the display medium, and the liquid crystal molecules are aligned in the direction of an electric field under the application of a voltage so as to display a transparent state. In contrast, the alignment of the liquid crystal molecules is disturbed under no application of a voltage so as to display a light scattering state.

However, the PDLC mode has a problem that a threshold voltage for driving a liquid crystal increases.

Japanese Laid-Open Patent Publication No. 5-257135 discloses a liquid crystal display device which locally contains a polymer with a network structure in a desired pattern as a display medium interposing a liquid crystal region and a region in which the alignment of liquid crystal molecules in the liquid crystal region is fixed by polymerization of a polymerizable liquid crystal between a pair of substrates. Such a polymer with a network structure can be formed by irradiation with light having a specific wavelength to the polymerizable liquid crystal material containing a reactive group such as a diacrylate group through a photomask.

In conventional liquid crystal display devices, an unnecessary voltage is applied to positions where electrodes or conductive tracks cross each other, whereby an undesired image is formed in these positions. In contrast, the polymer with a network structure in the above liquid crystal display device is formed in these positions by locally polymerizing a polymerizable liquid crystal material. Therefore, the alignment of a liquid crystal material in theses positions is fixed, and a switching threshold of the liquid crystal material can be locally enhanced. As a result, images are not likely to be formed in these positions under the application of a voltage.

However, the above-mentioned liquid crystal display device does not have sufficient shock resistance with respect to external pressure, while being capable of locally changing a switching threshold. Furthermore, the polymerizable liquid crystal material is generally highly reactive, and the polymerization thereof is considered to proceed with time in a region which is not irradiated with light. Therefore, the switching threshold, the alignment of liquid crystal molecules, and the like may gradually change in this liquid crystal display device.

Japanese Laid-Open Patent Publication No. 6-301015 discloses a liquid crystal display device 800 as shown in FIG. 8B. The liquid crystal display device 800 is produced in the following manner: As shown in FIG. 8A, a mixture 813 containing a liquid crystal material, a photopolymerizable resin, and a photopolymerization initiator is injected between a pair of substrates 801a and 801b. Then, a photomask 814 having light-blocking portions 810 and light-passing portions 811 is placed on the substrate 801a in such a manner that the light-blocking portions 810 cover pixel portions. Under this condition, the mixture 813 is irradiated with UV-light 808 through the photomask 814. As a result, as shown in FIG. 8B, liquid crystal regions 806 are formed in the pixel portions which are not irradiated with light, and a polymer wall 807 is formed in portions irradiated with light other than the pixel portions. Thus, the liquid crystal display device 800 having a liquid crystal medium layer is produced.

However, during the light irradiation in the course of producing the liquid crystal display device 800, the difference in optical path corresponding to the thickness of the substrate 801a is formed between the photomask 814 and the portions where polymer walls are formed. Thus, polymer walls which are wider than the light-passing portions of the photomask 814 are formed by light scattering, unless the light which is radiated to the substrate 801a is precisely parallel. Furthermore, even if parallel light is radiated to the substrate 801a, an unreacted photopolymerizable resin or the resultant polymer may remain in liquid crystal in the portions of the liquid crystal display device 800 which are light-blocked by the photomask 814, depending upon the type of photopolymerizable resin to be used. This decreases the display characteristics of the liquid crystal display device.

Japanese Laid-Open Patent Publication No. 7-287241 discloses a liquid crystal display device 900 as shown in FIG. 9B. The liquid crystal display device 900 is produced in the following manner: As shown in FIG. 9A, a transparent electrode 902a made of a material (e.g., ITO (Indidium Tin Oxide)), which is not likely to pass light with a specific wavelength, is formed on one surface of a substrate 901a, and a transparent electrode 902b made of the same material is formed on one surface of a substrate 901b. Then, the substrates 901a and 901b are placed in such a manner that the transparent electrodes 902a and 902b are opposed to each other. A mixture at least containing a liquid crystal material, a photopolymerizable resin, and a photopolymerization initiator is injected between the substrates 902a and 902b. The mixture is irradiated with light 908 having a specific wavelength through the substrates 901a and 901b. As a result, as shown in FIG. 9B, liquid crystal regions 906 are formed in pixel portions which are not irradiated with light, and a polymer wall 907 is formed in portions which are irradiated with light other than the pixel portions. Thus, the liquid crystal display device 900 having a liquid crystal medium layer is produced. Accordingly, in the liquid crystal display device 900 described in Japanese Laid-Open Patent Publication No. 7-287241, the transparent electrodes work as a photomask which reduces or blocks light having a specific wavelength.

However, in the production of the liquid crystal display device 900, the pixel portions composed of the liquid crystal regions 906 are also irradiated with light. Therefore, the resultant polymer remains in the pixel portions and may degrade the alignment of liquid crystal molecules and/or form insufficient pixel portions. This decreases the display characteristics of the liquid crystal display device.

When the intensity of the light radiated to the pixel portions is reduced for the purpose of solving the above-mentioned problems, the ratio of the intensity of transmitted light between the pixel portions and the portions other than the pixel portions decreases. As a result, unreacted photo-polymerizable resin remain in liquid crystal after phase separation, causing the alignment defect of liquid crystal molecules.

SUMMARY OF THE INVENTION

A liquid crystal display device of the present invention includes a liquid crystal region made of a liquid crystal as a display medium and a polymer wall surrounding the liquid crystal region between a pair of substrates, wherein the polymer wall is formed by selectively radiating light having different irradiation intensities to an irradiation intensity-dependent mixture containing a photopolymerizable monomer.

In one embodiment of the present invention, a polymerization rate of the photopolymerizable monomer contained in the irradiation intensity-dependent mixture in a non-pixel portion is 1.1 times or more that in a pixel portion.

In another embodiment of the present invention, an element for selectively radiating the light having different irradiation intensities includes a light-blocking layer reducing an amount of transmitted light with respect to a wavelength.

In another embodiment of the present invention, the element for selectively radiating the light having different irradiation intensities is a transparent electrode made of ITO.

In another embodiment of the present invention, the photopolymerizable monomer contained in the irradiation intensity-dependent mixture is at least-bifunctional acrylate or methacrylate monomer.

In another embodiment of the present invention, the irradiation intensity-dependent mixture contains at least-bifunctional acrylate or methacrylate monomer and an acrylate or methacrylate monomer having a structure similar to a liquid crystal molecule.

According to another aspect of the present invention, a method for producing a liquid crystal display device including a liquid crystal region made of a liquid crystal as a display medium and a polymer wall surrounding the liquid crystal region between a pair of substrates is provided. The method includes the steps of: injecting an irradiation intensity-dependent mixture containing a liquid crystal material for forming the liquid crystal region, a photopolymerizable monomer for forming the polymer wall, and a photopolymerization initiator between the attached pair of substrates to form a liquid crystal cell; selectively radiating light having different irradiation intensities to a predetermined portion of the liquid crystal cell at a high temperature; and cooling the liquid crystal cell after the light irradiation to form the polymer wall.

In one embodiment of the present invention, the above-mentioned method further includes the step of radiating light to the predetermined portion of the liquid crystal cell.

In another embodiment of the present invention, an amount of light irradiation in the step of selectively radiating light is 1000 mJ/cm$^2$ to 5000 mJ/cm$^2$.

In another embodiment of the present invention, an amount of light irradiation in the step of selectively radiating light is 1000 mJ/cm$^2$ to 5000 mJ/cm$^2$.

In another embodiment of the present invention, a cooling rate in the step of cooling the liquid crystal cell after the light irradiation is 1.0° C./minute or less.

In another embodiment of the present invention, a cooling rate in the step of cooling the liquid crystal cell after the light irradiation is 1.0° C./minute or less.

Thus, the invention described herein makes possible the advantages of (1) providing a liquid crystal display device having improved separation between liquid crystal regions and polymer walls, in which the liquid crystal regions are placed in pixel portions and the polymer walls are placed in portions other than the pixel portions by phase separation; (2) providing a liquid crystal display device with a satisfactory alignment of liquid crystal molecules; (3) providing a liquid crystal display device in which the ratio of opening in pixel portions is prevented from decreasing, and which has outstanding shock resistance with respect to external pressure; (4) providing a liquid crystal display device in which polymer walls have improved heat resistance; and (5) providing a method for producing such a liquid crystal display device in a simple manner.

These and other advantages of the present invention will become apparent to those skilled in the art upon reading and understanding the following detailed description with reference to the accompanying figures.

BRIEF DESCRIPTION OF THE DRAWINGS

FIG. 5 is a photomicrograph showing pixel portions in a liquid crystal display device produced in Comparative Example 16.

FIG. 6 is a photomicrograph showing a state where liquid crystal droplets are incorporated in polymer walls in a liquid crystal display device produced in Comparative Example 18.

FIG. 7 is a graph showing the relationship between the irradiation intensity and the polymerization rate of a photopolymerizable monomer used in the present invention.

FIG. 8A is a schematic view showing the step of radiating UV-light to a mixture containing a liquid crystal material, a photopolymerizable resin, and a photopolymerization initiator between a pair of substrates provided so as to be opposed to each other through a photomask; and FIG. 8B is a schematic view of a liquid crystal display device produced by the irradiation with UV-light.

FIG. 9A is a schematic view showing the step of radiating light having a specific wavelength to a mixture containing a liquid crystal material, a photopolymerizable resin, and a photopolymerization initiator between a pair of substrates each having a transparent electrode in a predetermined region; and FIG. 9B is a schematic view of a liquid crystal display device produced by the irradiation with light.

DESCRIPTION OF THE PREFERRED EMBODIMENTS

Figure 1:
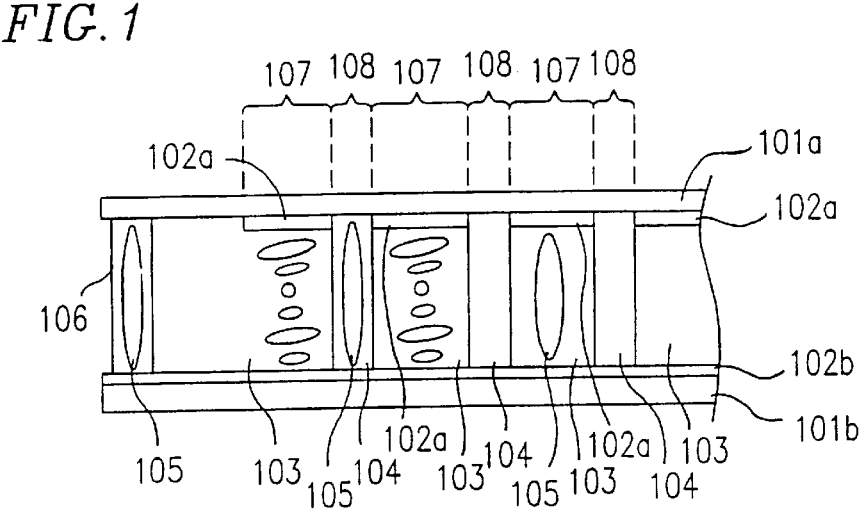
FIG. 1 is a schematic cross-sectional view showing an exemplary liquid crystal display device according to the present invention.

The liquid crystal display device of the present invention will be described with reference to FIG. 1.

The liquid crystal display device of the present invention includes a display medium interposed between a pair of substrates 101a and 101b. The display medium includes liquid crystal regions 103 in portions corresponding to pixels 107. The liquid crystal regions 103 are surrounded by polymer walls 104.

The substrate 101a has a plurality of band-shaped transparent electrodes 102a made of a material such as ITO formed in parallel with each other on the display medium side. The substrate 101b also has a plurality of transparent electrodes 102b made of a material such as ITO on the display medium side. The transparent electrodes 102a and 102b interpose the display medium so as to cross each other.

Furthermore, an electrical insulating layer and an alignment layer (not shown) are formed in this order between the transparent electrode 102a and the display medium and between the transparent electrode 102b and the display medium.

A preferable method for producing a liquid crystal display device according to the present invention will be exemplified.

First, a plurality of band-shaped transparent electrodes 102a and 102b are formed by sputtering in parallel with each other at a predetermined interval (e.g., about 20 µm), respectively on one surface of the substrates 101a and 101b made of a material such as glass. The width of the transparent electrodes 102a and 102b to be formed is not particularly limited, but for example, about 280 µm. Pixel portions become bigger along with the increase in the width of the transparent electrodes 102a and 102b. The thickness of the transparent electrodes 102a and 102b to be formed is not particularly limited, but for example, about 200 nm. The transparent electrodes 102a and 102b has a light transmittance of about 36%, for example, with respect to the light having a wavelength of 365 nm. Non-electrode portions 108 of the substrate 101a have a light transmittance of about 90%, for example, with respect to the light having a wavelength of 365 nm. It is known that the light transmittance of the transparent electrode decreases with the increase in the thickness of the transparent electrode.

Then, if required, an electrical insulating layer can be formed so as to cover the transparent electrodes 102a and 102b. The electrical insulating layer is formed by sputtering using $SiO_2$ or the like. The thickness of the electrical insulating layer to be formed is preferably about 50 nm to about 300 nm, and more preferably about 70 nm to about 100 nm.

Furthermore, if required, an alignment layer made of an organic material such as polyimide can be formed on the electrical insulating layer. The thickness of the alignment layer to be formed is preferably about 30 nm to about 200 nm, and more preferably about 50 nm to about 100 nm. The alignment layer thus formed is subjected to rubbing with a nylon cloth or the like. In general, substrates with an alignment layer formed thereon can be used for producing liquid crystal display devices in a TN mode, an STN mode, and the like, and substrates without an alignment layer formed thereon can be used for producing liquid crystal display devices in an axis-symmetrical alignment mode, and the like.

The substrates 101a and 101b produced as described above are attached to each other in such a manner that the band-shaped transparent electrodes 102a and 102b cross each other with spacers 5 made of a known material interposed therebetween. Then, the ends of the substrates 101a and 101b are attached to each other with a known sealant 6. The transparent electrodes 102a and 102b formed on the substrates 101a and 101b should be placed so as to cross each other. They may not cross at right angles. When the substrates 101a and 101b are attached to each other, an injection hole (not shown) is formed in a portion of the periphery of the substrates 101a and 1b.

Then, an irradiation intensity-dependent mixture containing a liquid crystal material, and a photopolymerizable monomer is injected between the substrates 101a and 101b through the injection hole, whereby a liquid crystal cell is formed. The term "irradiation intensity-dependent mixture" herein refers to a mixture at least containing a liquid crystal material and a photopolymerizable monomer whose polymerization rate changes depending upon the intensity of the light.

The liquid crystal material used in the present invention can be any liquid crystal materials used in conventional liquid crystal display devices in a TN mode, an STN mode, an ECB mode, an FLC mode, a light scattering mode, an axis-symmetrical alignment mode, and the like. Examples of such liquid crystal materials include ZLI-4427 containing 0.3% by weight of a chiral agent (S-811) (produced by Merck & Co., Inc.).

The photopolymerizable monomer used in the present invention forms the polymer walls 104 by selectively radiating light having different irradiation intensity as described later.

Examples of the photopolymerizable monomer used in the present invention include styrene type photopolymerizable monomers such as p-phenylstyrene; monofunctional (meth)acrylate such as adamanthyl acrylate, isobornyl acrylate, perfluoromethacrylate, R-694 (produced by Nippon Kayaku Co., LTD.), stearyl acrylate, and t-butylmethacrylate; bifunctional (meth)acrylate such as SR-2000 (produced by Nippon Kayaku Co., LTD.), R-684 (produced by Nippon Kayaku Co., LTD.), and hexanediol dimethacrylate (HDDMA); and bifunctional or more (meth) acrylate such as trimethylol propane trimethacrylate (TMPTMA); and mixtures thereof. In particular, the at least-bifunctional (meth)acrylate monomers are preferable. The polymer obtained from the at least-bifunctional (meth) acrylate monomers has crosslinkages. The molecular structure of the polymer is different from those of the monomers before the polymerization. Such a polymer cannot be dissolved in a liquid crystal. Thus, liquid crystal regions and polymer walls are sufficiently separated in the liquid crystal display device to be obtained by using these monomers. Furthermore, due to the crosslinkage in the polymer obtained from the monomers, the polymer walls in the liquid crystal display device has improved heat resistance.

Regarding the photopolymerizable monomer, it is further preferable to use, together with the above-mentioned bifunctional or more (meth)acrylate monomer, acrylate or methacrylate having a structure similar to a liquid crystal molecule, represented by the following formula (I):

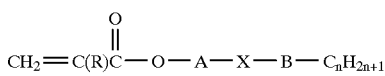

(I)

where A is

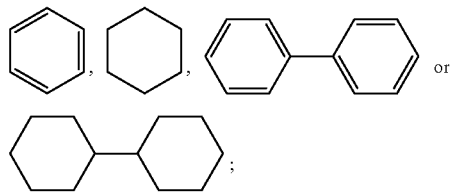

B is none, or

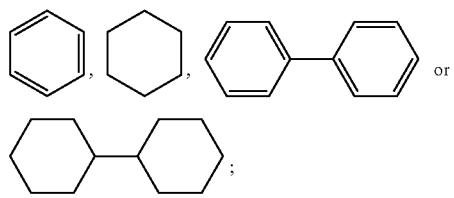

X is none, or

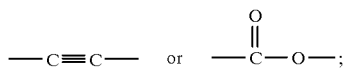

R is H or methyl; and n is an integer of 0 to 9, preferably 3 to 5. The monomer represented by formula (I) is known in the art. The photopolymerizable monomer having a structure similar to a liquid crystal molecule has a high compatibility with the liquid crystal material. Therefore, the polymerization rate of the photopolymerizable monomer during light irradiation can be controlled by changing the contents of the liquid crystal material and the photopolymerizable monomer in the mixture. By appropriately controlling the polymerization rate of the photopolymerizable monomer, the phase separation between the liquid crystal regions and the polymer walls can be sufficiently achieved.

The liquid crystal material and the photopolymerizable monomer are contained in the irradiation intensity-dependent mixture in such a manner that the polymerization rate of the photopolymerizable monomer in non-pixel portions becomes 1.1 times or more than that in pixel portions. In the case where the polymerization rate of the photopolymerizable monomer in the non-pixel portions is less than 1.1 times than that in the pixel portions, the phase separation between the liquid crystal regions and the polymer walls may not be sufficiently achieved in the liquid crystal display device to be obtained.

The irradiation intensity-dependent mixture can contain a photopolymerization initiator. Examples of the photopolymerization initiator which can be contained in the mixture include Irgacure 651 (produced by CIBA-GEIGY Corporation). Type and amount of the photopolymerization initiator to be used are not particularly limited.

The irradiation intensity-dependent mixture containing the above-mentioned liquid crystal material, photopolymerizable monomer, and photopolymerization initiator is injected between a pair of substrates 101a and 101b attached to each other through the injection hole at a predetermined temperature (e.g., about 30° C.). Then, the injection hole can be sealed with a known UV-curable resin by using UV-light or with a known adhesive such as a two pack adhesive and an instant adhesive. In the case where the injection hole is sealed with a UV-curable resin, it is desirable to radiate UV-light only to the injection hole.

Then, predetermined portions of the liquid crystal cell are irradiated with light. Herein, the "predetermined portions" can vary depending upon the purpose; however, they typically refer to the pixel portions and the non-pixel portions of the substrates 101a and 101b. The light is simultaneously radiated through the substrates 101a and 101b, or through one substrate and then through the other substrate. Alternatively, the light is radiated only through one substrate. For example, in the case where light is radiated only through one substrate 1lla, a plurality of liquid crystal regions 103 arranged in a row are formed so as to be placed in a stripe shape with respect to the transparent electrodes 102a formed in parallel with each other.

As a light source for conducting such light irradiation, for example, a high-pressure mercury lamp for UV-light irradiation capable of emitting parallel light can be used. Furthermore, for example, in the case where monochromatic light having a wavelength of 365 nm. is used, the amount of light irradiation is preferably 1000 mJ/cm$^2$ to 5000 mJ/cm$^2$, and more preferably 1200 mJ/cm$^2$ to 4000 mJ/cm$^2$. Even in the case where light having a different wavelength is radiated, the amount of light irradiation is preferably in this range. When the amount of light irradiation is less than 1000 mJ/cm$^2$ or more than 5000 mJ/cm$^2$, the liquid crystal display device to be obtained may not have outstanding display characteristics. However, in the case where a photopolymerizable monomer whose photopolymerization rate is very high and/or a great amount of photopolymerization initiator is used, the amount of light irradiation can be appropriately prescribed as needed without being limited to the above range.

According to the present invention, in order to selectively radiate light having different irradiation intensities, a light-blocking layer made of an inorganic layer or an organic layer capable of reducing the amount of transmitted light with respect to a specific wavelength is used. In the case where an ITO layer is used as a transparent electrode, this electrode works as a light-blocking layer. In the case where a material other than ITO is used for the transparent electrode and/or it is required to selectively adjust the amount of transmitted light, a photomask having regions having selectively different amounts of transmitted light can be used as a light-blocking layer.

The above-mentioned light irradiation is conducted at high temperatures. The light irradiation at high temperatures allows the liquid crystal between the substrates 101a and 101b to assume an isotropic state and the polymerization reaction to be uniformly effected.

When the liquid crystal cell is irradiated with light as described above, in accordance with the difference in intensity of light to be radiated, the liquid crystal regions 103 are formed in pixel portions corresponding to the overlapping portions of the transparent electrodes 102a and 102b between the substrates 101a and 101b, and the polymer walls 104 are formed in non-pixel portions other than the pixel portions. As a result, the liquid crystal regions 103 are surrounded by the polymer walls 104. Herein, the term "surround" used in the present specification refers to a state where the liquid crystal cell is partitioned by the polymer walls 104, as well as a state where the entire periphery of each liquid crystal region 103 is surrounded by the polymer wall 104.

Next, in order to stabilize the alignment of liquid crystal molecules, the liquid crystal cell is slowly cooled to room temperature in a cooling chamber. The cooling rate used in this step is preferably 1.0° C./minute or less, and more preferably 0.05° C./minute to 1.0° C./minute.

When the cooling rate exceeds 1.0° C./minute, the polymer walls in the liquid crystal display device to be obtained may not have sufficient strength with respect to the external pressure such as a pen input.

When the cooling rate is less than 0.050° C./minute, about more than 27 hours are required for cooling, for example, from 100° C. to 20° C. Therefore, it takes a long time to produce a liquid crystal display device, which is not industrially effective. Furthermore, it is difficult to produce an apparatus which is capable of achieving such a slow rate of cooling.

After the cooling, if required, the predetermined portions of the liquid crystal cell can be irradiated with light. The conditions of the light irradiation after the cooling can be arbitrarily set by those skilled in the art. For example, the preferable conditions of light irradiation used in the step of selectively radiating light having different irradiation intensities can be used. The amount of the light irradiation during the light irradiation after the cooling is desirably about 800 $mJ/cm^2$ to about 5000 $mJ/cm^2$. When the amount of the light irradiation is less than 800 $mJ/cm^2$, the polymer walls may not be sufficiently formed. When the amount of the light irradiation is more than 5000 $mJ/cm^2$, the liquid crystal may adversely effect on the alignment layer. By conducting further light irradiation after the cooling, an unreacted material remaining in the polymer walls is cured, whereby the sufficiently cross-linked polymer walls 104 can be obtained.

As described above, the liquid crystal display device of the present invention can be produced.

If required, a phase different plate is provided on one of the substrates of the liquid crystal display device, and polarizing plates are provided on both the phase different plate and the other substrate, whereby a liquid crystal display device in an STN mode can be produced. Alternatively, a reflection type liquid crystal display device can be produced by providing a reflective plate on one of the substrates of the liquid crystal display device.

In the liquid crystal display device thus produced, the liquid crystal regions 103 in which the liquid crystal is concentrated are formed in the pixel portions, and a polymer material used for forming the polymer walls does not remain at the interface between the liquid crystal regions 103 and the alignment layer. Thus, the liquid crystal display device has a satisfactory alignment state. Furthermore, in the non-pixel portions of the liquid crystal display device, the polymer walls 104 are formed without incorporating the liquid crystal, and in the pixel portions of the liquid crystal display device, the liquid crystal regions 103 having a shape and an area almost identical with those of the overlapping portions of the transparent electrodes 102a and 102b are formed without the polymer walls 104 being formed therein.

EXAMPLES

Hereinafter, the present invention will be described by way of illustrative examples. It should be noted that the present invention is not limited to the following examples. The evaluation items of the obtained liquid crystal display device are shown below. Like reference numerals refer to like parts throughout the drawings.

(Polymerization rate of a photopolymerizable monomer contained in an irradiation intensity-dependent mixture)

A solution of the irradiation intensity-dependent mixture, which contains a liquid crystal material, a photopolymerizable monomer, and a photopolymerization initiator, was irradiated with UV-light. The reaction heat generated by polymerization was measured by a photochemical reaction differential thermal calorimeter (PDC) (PDC121; manufactured by Seiko Denshi Kogyo Kabushiki Kaisha). This reaction heat generated by the polymerization depends on the type of molecules to be reacted, and the reaction heat generated by a predetermined amount of molecules during a particular reaction is constant. Thus, the polymerization rate of a photopolymerizable monomer in a liquid crystal solution can be calculated by measuring the changes with time in generated reaction heat and the amount of the photopolymerizable monomer reacted per unit time from the reaction heat.

Figures 2, 3:
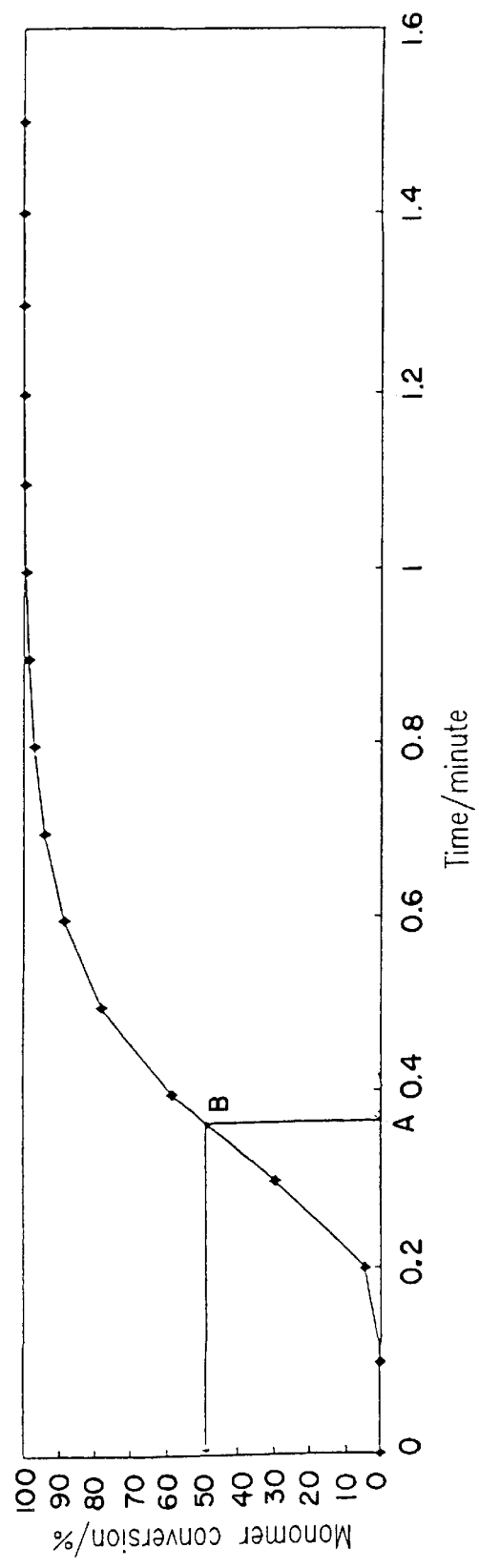
FIG. 2 is a graph showing the relationship between the time and the heat of reaction in the course of measuring the polymerization rate of a photo-polymerizable monomer.
FIG. 3 is a graph showing the relationship between the time and the monomer conversion in the course of measuring the polymerization rate of a photo-polymerizable monomer used in the present invention.
Figure 8A:
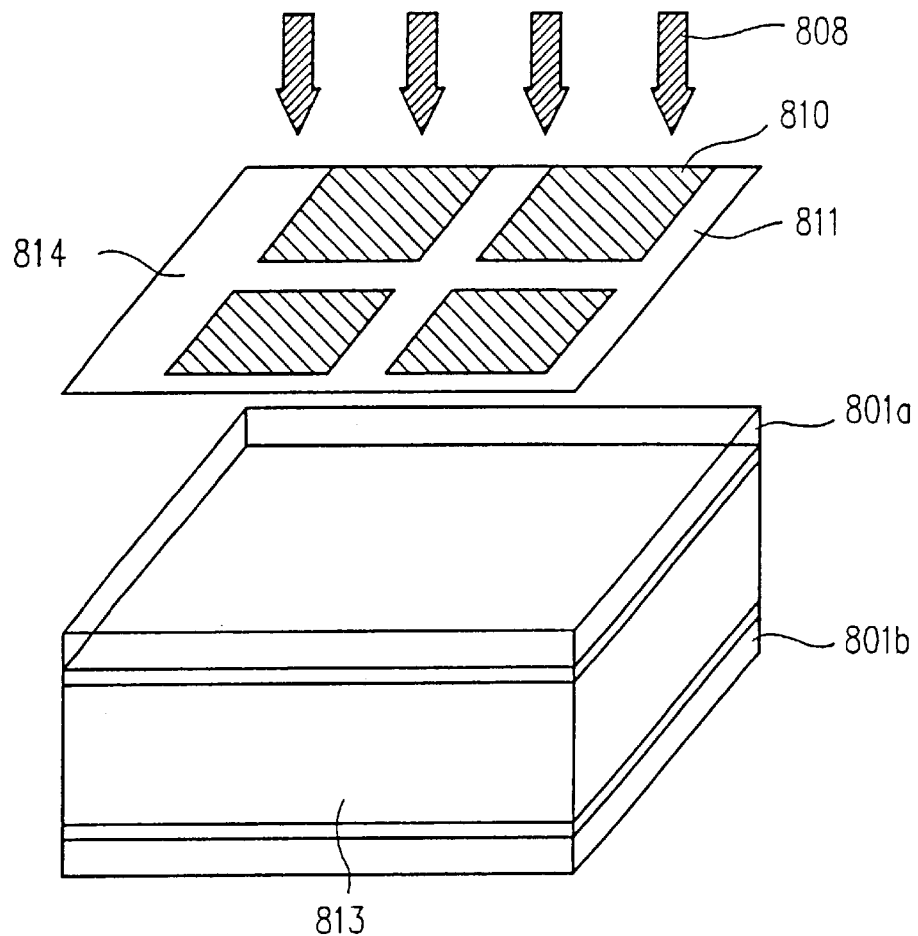
FIGS. 8A and 8B are schematic views illustrating a method for producing a conventional liquid crystal display device.
Figure 8B:
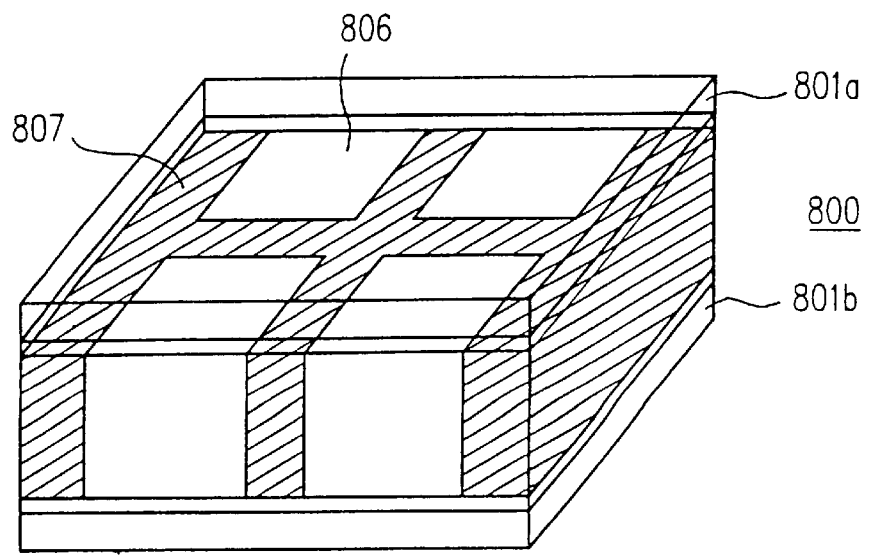
Figure 9A:
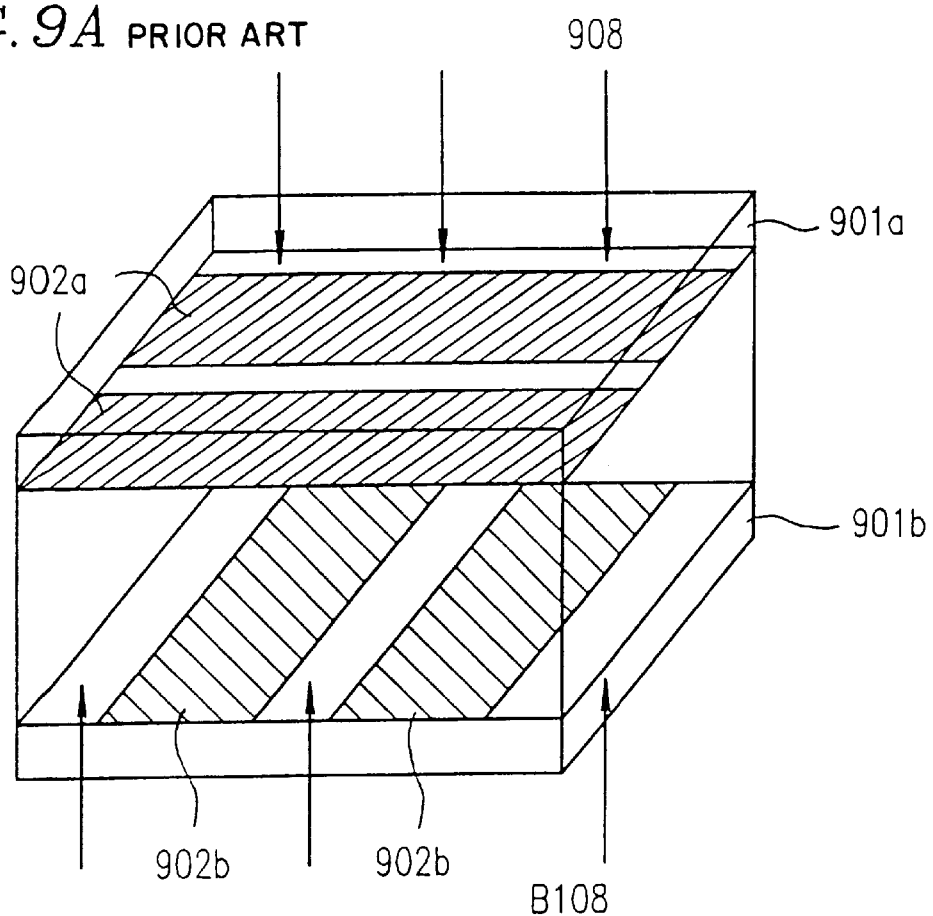
FIGS. 9A and 9B are schematic views illustrating a method for producing a conventional liquid crystal display device.
Figure 9B:
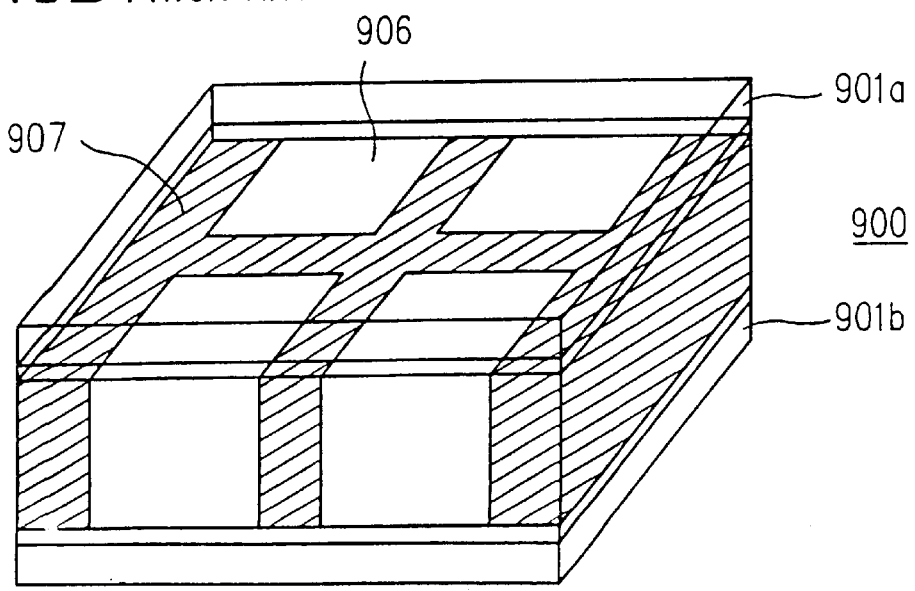

The polymerization rate will be described below. FIG. 2 shows the changes with time in reaction heat generated during the polymerization reaction of a conventional photopolymerizable monomer.

In FIG. 2, the reaction heat generated by the polymerization is integrated on a time basis, whereby the stages of the polymerization reaction, i.e., the changes with time in the conversion of the photopolymerizable monomer contained in the irradiation intensity-dependent mixture are obtained (FIG. 3). The maximum reaction rate corresponds to the slope of a tangent of an inflexion point B in FIG. 3, and the inflexion point B corresponds to a point at a time A where the amount of generated heat in FIG. 2 becomes maximum. In the present specification, the values of the monomer conversion up to the inflexion point B calculated as the amount per unit time was used as a polymerization rate (Alignment state)

The interface between liquid crystal regions and an alignment layer was observed with a microscope, and the alignment state was evaluated as follows:

⊚ . . . very satisfactory

◯ . . . satisfactory

Δ . . . poor x . . . very poor (Remaining amount of a polymer)

A polymer chip remaining in pixels of the produced liquid crystal display device was observed with a microscope, and the remaining amount was evaluated as follows:

⊚ . . . very satisfactory

◯ . . . satisfactory

Δ . . . large x . . . very large (Overall evaluation)

The overall evaluation was conducted based on the above-mentioned evaluation parameters of the liquid crystal display device as follows:

⊚ . . . very excellent

◯ . . . excellent

Δ . . . poor x . . . very poor

Example 1

An ITO layer having a thickness of 200 nm was formed on substrates 101a and 101b made of 7059 glass (produced by Corning), respectively, by sputtering. The ITO layer were patterned by photolithography, whereby a plurality of band-shaped transparent electrodes 102a and 102b with a width of 280 μm and an interval of 20 μm were formed on the substrates 101a and 101b, respectively. Then, an electrical insulating layer having a thickness of 100 nm made of $SiO_2$ was formed by sputtering on the transparent electrodes 102a and 102b, respectively. Furthermore, an alignment layer having a thickness of 80 nm (S-150; produced by Nissan Chemical Industries, Ltd.) was formed on each of the electrical insulating layer. These alignment layer were subjected to rubbing with a nylon cloth.

The light transmittance at 365 nm. of electrode portions and non-electrode portions of the substrate 101a thus obtained are shown in Table 1.

TABLE 1

|  | Electrode portion | Non-electrode portion |
|---|---|---|
| Light transmittance (365 nm: %) | 36 | 90 |

The substrates 101a and 101b were attached to each other in such a manner that the rubbing direction was identical with a twist angle. Spacers were dispersed between the substrates 101a and 10b. The ends of the substrates 101a and 101b were attached to each other with a sealant so that an injection hole was formed in the periphery of the substrates 101a and 101b. Then, a mixed solution which includes 3 g of ZLI-4427 containing 0.3% by weight of chiral agent (S-811) (produced by Merck & Co., Inc.), 0.04 g of a polymerizable monomer represented by the following formula (II):

(II)

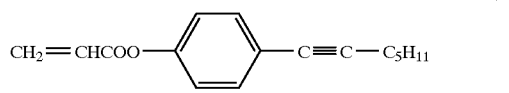

0.4 g of hexanediol dimethacrylate (HDDMA), and 0.008 g of Irgacure 651 (produced by CIBA-GEIGY Corporation) was injected between the attached substrates 101a and 101b by a known method. Since the opening ratio of the device was about 87%, the weight ratio of the liquid crystal to the total of the photopolymerizable monomer and the photopolymerization initiator was set to be 87:13.

After the mixed solution was injected, UV-light was radiated through both sides of the substrates 101a and 101b by a UV-lamp at 7 $mW/cm^2$ (365 nm.) for 4 minutes (irradiation amount: 1680 $mJ/cm^2$) at 100° C. so that the liquid crystal material between the substrates 101a and 101b assumed an isotropic state.

In the present example, the pixel portions were formed in overlapping portions of the electrode portions respectively formed on a pair of substrates. The non-pixel portions were formed in overlapping portions of the electrode portions on one substrate and the non-electrode portions on the other substrate and in overlapping portions of the non-electrode portions on both the substrates. The intensities of UV-light radiated to the pixel portions and the non-pixel portions in the present example are shown in Table 2.

TABLE 2

|  | Pixel portion | Non-pixel portion |
|---|---|---|
| UV-light intensity (365 nm: $mW/cm^2$) | 5.0 | 8.8 |

The polymerization rate of the photopolymerizable monomer contained in the irradiation intensity-dependent mixture in the pixel portions and the non-pixel portions, and the ratio of the polymerization rates are shown in Table 3.

TABLE 3

|  | Pixel portion A | Non-pixel portion B |
|---|---|---|
| Polymerization rate (%/min.) | 66.3 | 83.6 |
| Ratio of polymerization rate (B/A) | 1.26 | |

After the UV-light irradiation, in order to stabilize the alignment, the liquid crystal panel was slowly cooled from 100° C. to room temperature at a cooling rate of 0.12° C./minute (7° C./hour) in a cooling chamber.

After the cooling, the liquid crystal panel was irradiated with UV-light at 7 $mW/cm^2$ (365 nm.) for 2 minutes (irradiation amount: 840 $mJ/cm^2$) at room temperature through both sides of the substrates 101a and 10b.

The liquid crystal display device thus produced was observed with a microscope. This revealed that liquid crystal regions 103 in which the liquid crystal was concentrated were formed in pixel portions 107, and a satisfactory alignment state was obtained at the interface between the liquid crystal regions and the alignment layer without any remaining polymer. Furthermore, in the non-pixel portions, polymer walls 104 were formed without incorporating the liquid crystal. In the pixel portions, the liquid crystal regions 103 having a shape and an area almost identical with those of the overlapping portions of the transparent electrodes 102a and 102b were formed without any polymer wall 104.

The evaluation result of the liquid crystal display device thus obtained are shown in Table 4.

Example 2

A liquid crystal display device was produced in the same way as in Example 1, except that UV-light irradiation after the injection of the mixed solution and before the cooling was conducted at 5 $mW/cm^2$ (365 nm.) for 4 minutes (irradiation amount: 1200 $mJ/cm^2$). The evaluation result of the liquid crystal display device thus obtained is shown in Table 4.

Comparative Examples 1 AND 2

Liquid crystal display device were produced in the same way as in Example 1, except that UV-light irradiation after the injection of the mixed solution and before the cooling was conducted under the conditions shown in Table 4. The evaluation results of the liquid crystal display device thus obtained are shown in Table 4.

TABLE 4

|  | Irradiation amount[1] (mJ/cm²) | Polymerization rate (%/min.)[2] | | Ratio[3] (B/A) | Evaluation parameter | | |
|---|---|---|---|---|---|---|---|
|  |  | Pixel portion A | Non-pixel portion B |  | Alignment state | Polymer[3] | Overall evaluation |
| Example 1 | 1680 | 66.3 (5.0) | 83.6 (8.8) | 1.26 | ◎ | ◎ | ◎ |
| Example 2 | 1240 | 64.3 (3.6) | 70.4 (6.3) | 1.10 | ○ | ○ | ○ |
| Comparative Example 1 | 2880 | 83.6 (8.6) | 83.9 (15.1) | 1.00 | Δ | x | x |
| Comparative Example 2 | 720 | 62.5 (2.2) | 64.8 (3.8) | 1.04 | x | ○ | Δ |

[1]: Irradiation amount of UV-light radiated after the injection of a mixed solution before cooling.
[2]: Numerical values in parentheses represent the intensity of UV-light (mW/cm²) transmitted through pixel portions and non-pixel portions in a substrate.
[3]: Remaining amount of polymer As is understood from Table 4, in the case where the ratio of polymerization rates between the pixel portions and the non-pixel portions is 1.1 or more, excellent liquid crystal display devices were obtained. It is found that the ratio of polymerization rates can vary depending upon the irradiation intensity.

TABLE 5

|  | Content (% by weight) | | | | | Evaluation parameter | | |
|---|---|---|---|---|---|---|---|---|
|  | Liquid crystal material | Photo-polymerization initiator | Photopolymerizable monomer | | Ratio[1] (B/A) | Alignment state | polymer[2] | Overall evaluation |
|  |  |  | Compound (II) | HDDMA |  |  |  |  |
| Example 1 | 87.00 | 0.23 | 1.16 | 11.61 | 1.26 | ◎ | ◎ | ◎ |
| Comparative Example 3 | 86.73 | 0.50 | 1.16 | 11.61 | 1.08 | ◎ | Δ | Δ |
| Comparative Example 4 | 87.15 | 0.08 | 1.16 | 11.61 | 1.03 | x | Δ | Δ |
| Example 3 | 84.16 | 0.23 | 4.00 | 11.61 | 1.33 | ◎ | ○ | ○ |
| Example 4 | 88.16 | 0.23 | 0.00 | 11.61 | 1.13 | ◎ | ○ | ○ |
| Comparative Example 5 | 90.61 | 0.23 | 1.16 | 8.00 | 1.05 | Δ | Δ | Δ |
| Comparative Example 6 | 83.61 | 0.23 | 1.16 | 15.00 | 1.01 | Δ | X | Δ |

[1]: Ratio of polymerization rate
[2]: Remaining amount of polymer

Examples 3 and 4

Liquid crystal display devices were produced in the same way as in Example 1, except for using mixed solutions containing a liquid crystal material, a photopolymerizable monomer, and a photopolymerization initiator which had contents shown in Table 5. The evaluation results of the liquid crystal display device thus obtained are shown in Table 5.

Comparative Examples 3 Through 6

Liquid crystal display devices were produced in the same way as in Example 1, except for using mixed solutions containing a liquid crystal material, a photopolymerizable monomer, and a photopolymerization initiator which had contents shown in Table 5. The evaluation results of the liquid crystal display device thus obtained are shown in Table 5.

As is understood from Table 5, the ratio of polymerization rates varies depending upon the contents of the liquid crystal material, the photopolymerization initiator, and the photopolymerized monomer, and the liquid crystal display devices obtained at a ratio of polymerization rates of more than 1.1 are excellent.

Example 5

A liquid crystal display device was produced in the same way as in Example 1, except that 8% by weight of stearyl acrylate, 4% by weight of R-684 (produced by Nippon Kayaku Co., Ltd.), and 2% by weight of p-phenylstyrene were used as a photopolymerizable monomer. The evaluation results of the liquid crystal display device thus-obtained are shown in Table 6.

Comparative Example 7

A liquid crystal display device was produced in the same way as in Example 1, except that 10% by weight of stearyl acrylate, 2% by weight of R-684 (produced by Nippon Kayaku Co., Ltd.), and 2% by weight of p-phenylstyrene were used as a photopolymerizable monomer. The evaluation results of the liquid crystal display device thus obtained are shown in Table 6.

Example 6

A liquid crystal display device was produced in the same way as in Example 1, except that 5% by weight of isobornyl acrylate and 5% by weight of HDDMA were used as a photopolymerizable monomer. The evaluation results of the liquid crystal display device thus obtained are shown in Table 6.

Comparative Example 8

A liquid crystal display device was produced in the same way as in Example 1, except that 8% by weight of acrylate and 2% by weight of HDDMA were used as a photopolymerizable monomer. The evaluation results of the liquid crystal display device thus obtained are shown in Table 6.

Example 7

A liquid crystal display device was produced in the same way as in Example 1, except that 3% by weight of R-694 (produced by Nippon Kayaku Co., Ltd.), 4% by weight of R-684 (produced by Nippon Kayaku Co., Ltd.), and 3% by weight of HDDMA were used as a photopolymerizable monomer. The evaluation results of the liquid crystal display device thus obtained are shown in Table 6.

Comparative Example 9

A liquid crystal display device was produced in the same way as in Example 1, except that 1% by weight of R-694 (produced by Nippon Kayaku Co., Ltd.), 4% by weight of R-684 (produced by Nippon Kayaku Co., Ltd.), and 5% by weight of HDDMA were used as a photopolymerizable monomer. The evaluation results of the liquid crystal display device thus obtained are shown in Table 6.

Example 8 liquid crystal display device was produced in the same way as in Example 1, except that 6% by weight of t-butyl methacrylate and 4% by weight of stearyl acrylate were used as a photopolymerizable monomer. The evaluation results of the liquid crystal display device thus obtained are shown in Table 6.

Comparative Example 10

A liquid crystal display device was produced in the same way as in Example 1, except that 2% by weight of t-butyl methacrylate and 8% by weight of stearyl acrylate were used as a photopolymerizable monomer. The evaluation results of the liquid crystal display device thus obtained are shown in Table 6.

Example 9

A liquid crystal display device was produced in the same way as in Example 1, except that 5% by weight of SR-2000 (produced by Nippon Kayaku Co., Ltd.) and 5% by weight of the compound represented by the above formula (II) were used as a photopolymerizable monomer. The evaluation results of the liquid crystal display device thus obtained are shown in Table 6.

Comparative Example 11

A liquid crystal display device was produced in the same way as in Example 1, except that 8% by weight of SR-2000 (produced by Nippon Kayaku Co., Ltd.) and 2% by weight of the compound represented by the above formula (II) were used as a photopolymerizable monomer. The evaluation results of the liquid crystal display device thus obtained are shown in Table 6.

Example 10

A liquid crystal display device was produced in the same way as in Example 1, except that 4% by weight of R-684 (produced by Nippon Kayaku Co., Ltd.) and 5% by weight of the compound represented by the above formula (II) were used as a photopolymerizable monomer. The evaluation results of the liquid crystal display device thus obtained are shown in Table 6.

Comparative Example 12

A liquid crystal display device was produced in the same way as in Example 1, except that 8% by weight of R-684 (produced by Nippon Kayaku Co., Ltd.) and 1% by weight of the compound represented by the above formula (II) were used as a photopolymerizable monomer. The evaluation results of the liquid crystal display device thus obtained are shown in Table 6.

Example 11

A liquid crystal display device was produced in the same way as in Example 1, except that 4% by weight of TMPTMA and 5% by weight of the compound represented by the above formula (II) were used as a photopolymerizable monomer. The evaluation results of the liquid crystal display device thus obtained are shown in Table 6.

Comparative Example 13

A liquid crystal display device was produced in the same way as in Example 1, except that 8% by weight of TMPTMA and 1% by weight of the compound represented by the above formula (II) were used as a photopolymerizable monomer. The evaluation results of the liquid crystal display device thus obtained are shown in Table 6.

Example 12

A liquid crystal display device was produced in the same way as in Example 1, except that 4% by weight of HDDMA, 3% by weight of the compound represented by the above formula (II), and 3% by weight of a compound represented by the following formula (III):

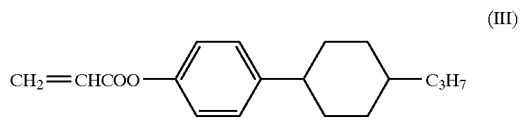

were used as a photopolymerizable monomer. The evaluation results of the liquid crystal display device thus obtained are shown in Table 6.

Comparative Example 14

A liquid crystal display device was produced in the same way as in Example 1, except that 2% by weight of HDDMA, 4% by weight of the compound represented by the above formula (II), and 4% by weight of the compound represented by the above formula (III) were used as a photopolymerizable monomer. The evaluation results of the liquid crystal display device thus obtained are shown in Table 6.

TABLE 6

|  |  | Ratio[1] (B/A) | Evaluation parameter | | |
|---|---|---|---|---|---|
|  |  |  | Alignment state | Remaining polymer[2] | Overall evaluation |
| Example 5 | stearyl acrylate/R-684/ | 1.10 | ○ | ⊙ | ○ |
| Comparative Example 7 | p-phenylstyrene | 1.00 | x | Δ | x |
| Example 6 | isobornyl acrylate/HDDMA | 1.18 | ○ | ○ | ○ |
| Comparative Example 8 |  | 1.00 | x | Δ | x |
| Example 7 | R-694/R-684/HDDMA | 1.24 | ⊙ | ○ | ○ |
| Comparative Example 9 |  | 1.00 | Δ | x | x |
| Example 8 | t-butyl methacrylate/ | 1.12 | ○ | ○ | ○ |
| Comparative Example 10 | stearyl acrylate | 1.00 | x | Δ | x |
| Example 9 | SR-2000/compound (II) | 1.20 | ⊙ | ⊙ | ⊙ |
| Comparative Example 11 |  | 1.00 | Δ | x | x |
| Example 10 | R-684/compound (II) | 1.23 | ⊙ | ⊙ | ⊙ |
| Comparative Example 12 |  | 1.00 | Δ | x | x |
| Example 11 | TMPTMA/compound (II) | 1.10 | ⊙ | ○ | ○ |
| Comparative Example 13 |  | 1.00 | Δ | x | x |
| Example 12 | HDDMA/compound (II)/ | 1.38 | ⊙ | ⊙ | ⊙ |
| Comparative Example 14 | compound (III) | 1.00 | x | Δ | x |

[1]: Ratio of polymerization rate
[2]: Remaining amount of polymer

As is understood from Table 6, the ratio of polymerization rates varies depending upon the contents of the photopolymerizable monomer, and liquid crystal display devices obtained at a ratio of polymerization rates of 1.1 or more are excellent.

The results shown in Tables 3 through 6 will be summarized in the order of polymerization rates in Table 7.

TABLE 7

|  | Ratio[1] | Condition | Varied parameter | | | Overall evaluation |
|---|---|---|---|---|---|---|
|  |  |  | Irradiation intensity | Content | Type of photo-polymerizable monomer |  |
| 1 | 1.38 | Example 12 |  |  | ○ | ⊙ |
| 2 | 1.33 | Example 3 | ○ |  |  | ⊙ |
| 3 | 1.26 | Example 1 |  |  |  | ⊙ |
| 4 | 1.24 | Example 7 |  |  | ○ | ⊙ |
| 5 | 1.23 | Example 10 |  |  | ○ | ⊙ |
| 6 | 1.20 | Example 9 |  |  | ○ | ⊙ |
| 7 | 1.18 | Example 6 |  |  | ○ | ○ |
| 8 | 1.13 | Example 4 | ○ |  |  | ○ |
| 9 | 1.12 | Example 8 |  |  | ○ | ○ |
| 10 | 1.10 | Example 2 | ○ |  |  | ○ |
| 11 | 1.10 | Example 5 |  |  | ○ | ○ |
| 12 | 1.10 | Example 11 |  |  | ○ | ○ |
| 13 | 1.08 | Comparative Example 3 |  | ○ |  | Δ |
| 14 | 1.05 | Comparative Example 5 |  | ○ |  | Δ |
| 15 | 1.04 | Comparative Example 2 |  | ○ |  | Δ |
| 16 | 1.03 | Comparative Example 4 |  | ○ |  | Δ |
| 17 | 1.01 | Comparative Example 6 | ○ |  |  | Δ |
| 18 | 1.00 | Comparative Example 1 |  | ○ |  | x |

TABLE 7-continued

|  | Ratio[1] | Condition | Varied parameter | | | Overall evaluation |
|---|---|---|---|---|---|---|
|  |  |  | Irradiation intensity | Content | Type of photo-polymerizable monomer |  |
| 19 | 1.00 | Comparative Example 7 |  |  | ○ | x |
| 20 | 1.00 | Comparative Example 8 |  | ○ |  | x |
| 21 | 1.00 | Comparative Example 9 |  |  | ○ | x |
| 22 | 1.00 | Comparative Example 10 | ○ |  |  | x |
| 23 | 1.00 | Comparative Example 11 |  |  | ○ | x |
| 24 | 1.00 | Comparative Example 12 |  |  | ○ | x |
| 25 | 1.00 | Comparative Example 13 |  |  | ○ | x |
| 26 | 1.00 | Comparative Example 14 |  |  | ○ | x |

[1]: Ratio of polymerization rate

It is understood from Table 7 that, in the above-mentioned Examples and Comparative Examples, when the polymerization rate of the photopolymerizable monomer in the irradiation intensity-dependent mixture in the non-pixel portions is 1.1 times or more of that in the pixel portions, the phase separation between the liquid crystal regions and the polymer walls can be sufficiently achieved, the liquid crystal regions in which the liquid crystal is concentrated can be formed in the pixel portions, and the polymer walls can be formed in the non-pixel portions without incorporating the liquid crystal.

Example 13

A liquid crystal display device was produced in the same way as in Example 1, except that UV-light irradiation after the injection of the mixed solution and before the cooling was conducted at 8 mW/cm$^2$ (365 nm.) for 200 seconds (irradiation amount: 1600 mJ/cm$^2$).

Then, various voltages V were applied to the liquid crystal display device, and each light transmittance T of the liquid crystal display device was measured. A voltage-transmittance (V-T) curve thus obtained is represented by (a) in FIG. 4.

Example 14

A liquid crystal display device was produced in the same way as in Example 1, except that UV-light irradiation after the injection of the mixed solution and before the cooling was conducted at 8 mW/cm$^2$ (365 nm.) for 400 seconds (irradiation amount: 3200 mJ/cm$^2$).

Then, various voltages V were applied to the liquid crystal display device, and each light transmittance T of the liquid crystal display device was measured. A voltage-transmittance (V-T) curve thus obtained is represented by (b) in FIG. 4.

Comparative Example 15

A liquid crystal display device was produced in the same way as in Example 1, except that UV-light irradiation after the injection of the mixed solution and before the cooling was conducted at 8 mW/cm$^2$ (365 nm.) for 100 seconds (irradiation amount: 800 mJ/cm$^2$).

Then, various voltages V were applied to the liquid crystal display device, and each light transmittance T of the liquid crystal display device was measured. A voltage-transmittance (V-T) curve thus obtained is represented by (c) in FIG. 4.

Figure 4:
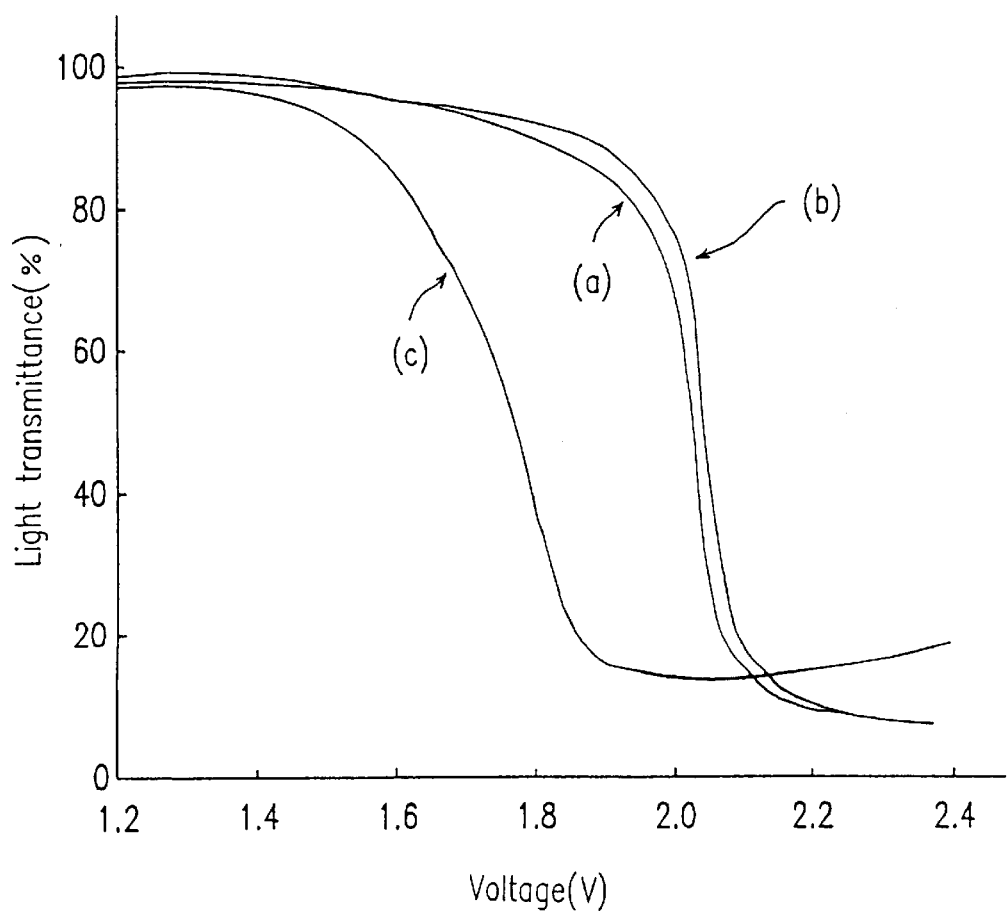
FIG. 4 is a graph showing voltage-light transmittance characteristics of liquid crystal display devices produced in Examples 13 and 14, and Comparative Example 15.

As is understood from FIG. 4, the slope of the curves for the liquid crystal display devices produced in Examples 13 and 14 are steeper in a liquid crystal portion and have a higher threshold voltage, compared with the liquid crystal display device produced in Comparative Example 15. Therefore, in the liquid crystal display devices produced in Examples 13 and 14, the phase separation between the liquid crystal regions and the polymer walls are sufficiently achieved, and outstanding display performance is obtained.

Comparative Example 16

A liquid crystal display device was produced in the same way as in Example 1, except that UV-light irradiation after the injection of the mixed solution and before the cooling was conducted at 8 mW/cm$^2$ (365 nm.) for 700 seconds (irradiation amount: 5600 mJ/cm$^2$).

The liquid crystal display device thus obtained was observed. This revealed that the resin of the polymer walls moved to the pixel portions and accumulated on the alignment layer; as a result, a uniform alignment state was not obtained due to the presence of a portion $P_1$ showing a normal alignment state and a porion $P_2$ of a low twisted domain as shown in FIG. 5.

Example 15

A liquid crystal display device was produced in the same way as in Example 1, except that the cooling rate was set to be 1.0° C./minute.

The pressure resistance value (g/mmφ) of the liquid crystal display device was measured by using a push-pull gauge with a pen tip of 1 mmφ. The pressure resistance value thus obtained is shown in Table 8.

Example 16

A liquid crystal display device was produced in the same way as in Example 1, except that the cooling rate was set to be 0.7° C./minute. Then, the pressure resistance value of the liquid crystal display device was measured in the same way as in Example 15. The pressure resistance value thus obtained is shown in Table 8.

Example17

A li quid crystal display device was produced in the same way as in Example 1, except that the cooling rate was set to be 0.3° C./minute. Then, the pressure resistance value of the liquid crystal display device was measured in the same way as in Example 15. The pressure resistance value thus obtained is shown in Table 8.

Example 18

A liquid crystal display device was produced in the same way as in Example 1, except that the cooling rate was set to be 0.1° C./minute. Then, the pressure resistance value of the liquid crystal display device was measured in the same way as in Example 15. The pressure resistance value thus obtained is shown in Table 8.

Example 19

A liquid crystal display device was produced in the same way as in Example 1, except that the cooling rate was set to be 0.05° C./minute. Then, the pressure resistance value of the liquid crystal display device was measured in the same way as in Example 15. The pressure resistance value thus obtained is shown in Table 8.

Comparative Example 17

A liquid crystal display device was produced in the same way as in Example 1, except that the cooling rate was set to be 3.0° C./minute. Then, the pressure resistance value of the liquid crystal display device was measured in the same way as in Example p15. The pressure resistance value thus obtained is shown in Table 8.

Comparative Example 18

A liquid crystal display device was produced in the same way as in Example 1, except that the cooling rate was set to be 1.2° C./minute. Then, the pressure resistance value of the liquid crystal display device was measured in the same way as in Example 15. The pressure resistance value thus obtained is shown in Table 8.

Furthermore, the polymer walls in the liquid crystal display device were observed. This revealed that a number of liquid crystal droplets 62 were incorporated in the polymer walls 61 as shown in FIG. 6.

TABLE 8

|  | Comparative Example 17 | Comparative Example 18 | Example 15 | Example 16 | Example 17 | Example 18 | Example 19 |
|---|---|---|---|---|---|---|---|
| Cooling rate (° C./min.) | 3.0 | 1.2 | 1.0 | 0.7 | 0.3 | 0.1 | 0.05 |
| Pressure resistance value (g/mmφ) | 120 | 240 | 300 | 340 | 380 | 410 | 420 |

As shown in Table 8, as the cooling rate is lower, the pressure resistance value of the produced liquid crystal display device is likely to increase. Thus, the amount of liquid crystal incorporated in the polymer walls is smaller in the liquid crystal display devices produced in Examples 15 through 19 than in those produced in Comparative Examples 17 and 18. The liquid crystal display devices produced in Examples 15 through 19 have sufficient strength with respect to the external pressure such as a pen input.

As is apparent from the above Examples, the changes in polymerization rate of the photopolymerizable monomer contained in the irradiation intensity-dependent mixture with respect to the irradiation intensity are represented as shown in FIG. 7.

Even under a constant irradiation intensity, the polymerization rate varies depending upon the type of the photopolymerizable monomer, a solvent to be used (liquid crystal in the present invention), the concentration thereof, temperature during light irradiation, and a blend ratio of a plurality of resins if used.

The polymerization rate hardly varies when irradiation intensity exceeds a certain value. According to the present invention, light with different irradiation intensities is selectively radiated. More specifically, light is radiated in the range of the irradiation intensities which cause the difference in polymerization rate of the photopolymerizable monomer contained in the irradiation intensity-dependent mixture with such reaction characteristics. Thus, the polymer walls are formed in non-pixel portions and liquid crystal regions are formed in pixel portions.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for producing a liquid crystal display device including a plurality of liquid crystal regions made of a liquid crystal as a display medium and a polymer wall surrounding the plurality of liquid crystal regions between a pair of substrates, comprising the steps of:

injecting an irradiation intensity-dependent mixture containing a liquid crystal material for forming the plurality of liquid crystal regions, a photopolymerizable monomer for forming the polymer wall, and a photopolymerization initiator between the attached pair of substrates to form a liquid crystal cell;

selectively radiating light having different irradiation intensities to a predetermined portion of the liquid crystal cell at a high temperature; and cooling the liquid crystal cell after the light irradiation to form the polymer wall, wherein a polymerization rate of the photopolymerizable monomer contained in the irradiation intensity-dependent mixture in non-pixel portions between pixel portions is 1.1 times or more than that in the pixel portions.

2. A method for producing a liquid crystal display device according to claim 1, further comprising the step of radiating light to the predetermined portion of the liquid crystal cell after the step of cooling the liquid crystal cell.

3. A method for producing a liquid crystal display device according to claim 1, wherein an amount of light irradiation in the step of selectively radiating light is 1000 mJ/cm$^2$ to 5000 mJ/Cm$^2$.

4. A method for producing a liquid crystal display device according to claim 2, wherein an amount of light irradiation in the step of selectively radiating light after the step of cooling the liquid crystal cell is 800 mJ/cm$^2$ to 5000 mJ/cm$^2$.

5. A method for producing a liquid crystal display device according to claim wherein 1, cooling rate in the step of cooling the liquid crystal cell after the light irradiation is 1.0° C./minute or less.

6. A method for producing a liquid crystal display device according to claim wherein 2, cooling rate in the step of cooling the liquid crystal cell after the light irradiation is 1.0° C./minute or less.

* * * * *